(12) United States Patent
Chang

(10) Patent No.: US 9,893,332 B2
(45) Date of Patent: Feb. 13, 2018

(54) CAR BATTERY

(76) Inventor: Tsun-Yu Chang, Taichung (TW)

( * ) Notice: Subject to any disclaimer, the term of this patent is extended or adjusted under 35 U.S.C. 154(b) by 943 days.

(21) Appl. No.: 12/057,624

(22) Filed: Mar. 28, 2008

(65) Prior Publication Data

US 2008/0241653 A1  Oct. 2, 2008

(30) Foreign Application Priority Data

Mar. 29, 2007 (TW) .................................. 96205108

(51) Int. Cl.
| | |
|---|---|
| *H01M 10/052* | (2010.01) |
| *H01M 2/10* | (2006.01) |
| *H01M 2/20* | (2006.01) |
| *H01M 10/0525* | (2010.01) |
| *H01M 4/58* | (2010.01) |

(52) U.S. Cl.
CPC ......... *H01M 2/1077* (2013.01); *H01M 2/206* (2013.01); *H01M 10/0525* (2013.01); *H01M 4/5825* (2013.01); *Y02E 60/122* (2013.01)

(58) Field of Classification Search
USPC ........................................ 429/159, 187, 221
See application file for complete search history.

(56) References Cited

U.S. PATENT DOCUMENTS

| | | | | |
|---|---|---|---|---|
| 4,169,918 A | * | 10/1979 | Moore ....................... | 429/159 X |
| 4,464,445 A | * | 8/1984 | Matti ........................ | 429/159 X |
| 5,187,027 A | * | 2/1993 | Larkin ....................... | 429/159 X |
| 5,578,392 A | * | 11/1996 | Kawamura ............... | 429/159 X |
| 5,766,801 A | * | 6/1998 | Inoue et al. ............... | 429/159 X |
| 5,910,382 A | * | 6/1999 | Goodenough et al. ... | 429/221 X |
| 6,022,638 A | * | 2/2000 | Horton et al. ............. | 429/187 |
| 6,428,933 B1 | * | 8/2002 | Christensen .......... | H01M 4/134 |
| | | | | 429/231.4 |
| 6,528,206 B2 | * | 3/2003 | Ruiz Rodriguez | |
| | | | et al. .......................... | 429/159 X |
| 2005/0069777 A1 | * | 3/2005 | Takami ............... | H01M 2/0275 |
| | | | | 429/245 |
| 2005/0255379 A1 | * | 11/2005 | Marchio ............. | H01M 2/0242 |
| | | | | 429/153 |

OTHER PUBLICATIONS

Battery Bank Tutorial—Series and Parallel, https://www.batterystuff.com/kb/articles/battery-articles/battery-bank-tutorial.html, Printed Aug. 6, 2016.*

* cited by examiner

*Primary Examiner* — Maria Laios
(74) *Attorney, Agent, or Firm* — McClure, Qualey & Rodack, LLP

(57) ABSTRACT

A car battery comprises: four lithium ferro-phosphate batteries serially connected and positioned within a battery case with the anode and cathode caps exposed and connected to each other, and each of the lithium ferro-phosphate batteries has a capacity of 10-20 ampere-hour. The car battery also comprises two wires respectively connected to the anode and cathode caps, and the wires are thus connected to the anode and cathode of the lithium ferro-phosphate batteries connected in series.

14 Claims, 5 Drawing Sheets

CAR BATTERY

RELATED APPLICATIONS

This application claims priority to Taiwan Application Serial Number 96205108, filed Mar. 29, 2007, which is herein incorporated by reference.

BACKGROUND

Field of Invention

The invention relates to a car battery, more particularly, to a car battery for a car ignition system.

Description of Related Art

Lead-acid batteries have been used for a long time. Lead-acid battery anodes are composed of lead the cathodes are composed of lead dioxide, and the electrolyte is a sulfuric acid solution of 27-39% capable of providing a voltage of 2.0 V. The lead-acid battery has several advantages, such as a high voltage potential, a wide operating temperature, a simplified structure, a well developed technology, a lower cost, and a longer cycling life. These advantages ensure lead-acid batteries play an important role in the battery industry worldwide. Over the past hundred years, the lead-acid battery has always been part of the standard equipment for a car ignition system.

However, the lead-acid battery also suffers from some vital disadvantages, such as raising the problems of serious pollution, a heavy weight and a limited lifespan. The lead-acid battery waste decomposes into a lot of heavy metals and wastewater thereby damaging ecological systems and threatening human health. The waste battery contains metal ions, such as mercury, lead, cadmium, chromium, nickel, and manganese etc, and an alkali or acid electrolyte solution. Once the pollutants enter the human body, the pollutants harm the nervous system, the hematopoietic function, the kidneys and bones. The weight of the lead-acid battery, such as a battery with a capacity of 65 Ah is about 15-20 kilograms. These batteries are, when considering their size and weight, inefficient energy produces resulting in a lot of energy wastage. The heavy weight of the lead-acid battery will, in the future, ensure it becomes an outdated component and eliminated from future car designs.

Besides, a lead-acid battery is incapable of performing a deep discharge, if the lead-acid battery performs a deep charge and discharge with about 70% of the capacity (a cycle), the lifespan of the battery will be shortened. Accordingly, the capacity of the lead-acid battery is desired within 60-80 Ah. The high output power of the lead-acid battery is also a factor of the heavy weight. To generate the high ignition current, the lead-acid battery must have an expanded capacity (by way of increasing battery weight).

Moreover, the lead-acid battery has problems of a shorten lifespan and a high self-discharging rate. If a deep discharge (80% of the capacity is discharged, if the driver forgets to turn off a car light) is performed, a new lead-acid battery must be implemented to replace the old one in about 1-2 years. The high self-discharging rate will cause the battery to totally run out of energy in about 2-3 months.

Accordingly, the vehicle industry needs an improved energy storage device for starting the ignition of a vehicle, and provides it for future electric cars.

SUMMARY

Therefore, one aspect of the invention is to provide a car battery to prevent the above problems caused by the lead-acid battery.

The aspect of the invention is to develop a better car battery. It should be noted that the chemical material selected, battery type and battery pack are all the focus emphasized in the invention.

Any new chemical battery for implementation in a vehicle must be light, have high space utility, and have a high weight energy density. Lithium batteries meet these requirements and are the best alternatives currently available in the electric-chemistry industry. Generally speaking, the lithium batteries also comply with strict environmental protection requirements (such as RoHS). Lithium ferro-phosphate batteries are also one of the best alternatives to the lead-acid batteries. Lithium ferro-phosphate batteries typically have a high-power output, high energy density and long battery lifecycles. Furthermore, lithium ferro-phosphate batteries comply with the strict safety and environmental requirements placed on electronic and electrical components. Also, when compared with cobalt, nickel, and manganese, iron is a more abundant element stored in the earth's crust and thus lower costs can be achieved. Accordingly, the lithium ferro-phosphate battery preferably uses an iron-based material for the anode implemented by the embodiment of the invention.

Despite these features, lithium ferro-phosphate battery will not necessarily be light and would therefore have to be combined with other components and parts to ensure the battery is a relatively light-weight case battery with high energy efficiency.

The car battery of the invention cannot only eliminate the aforesaid disadvantages of the conventional art, but also has the following advantages:

1. a lighter weight results from a high energy density, which includes a volumetric energy density and gravimetric energy density;
2. a high output power capacity (capable of generating a high current);
3. a longer cycle life substantially capable of performing hundreds of deep discharges;
4. an improved safety accomplished by using a non-corrosive strong acid;
5. complying with stringent environmental protection requirements, since the battery does not contain any heavy metal elements, it is easier to process the battery waste;
6. a reasonable price with a novel cathode material;
7. given fewer connecting points, thus it is possible to manufacture a plurality of batteries at the same time in a safer way;
8. an easier way to install and dismantle it; and
9. a lighter weight, so the user can carry it from the car for a variety of purposes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Figure 1:
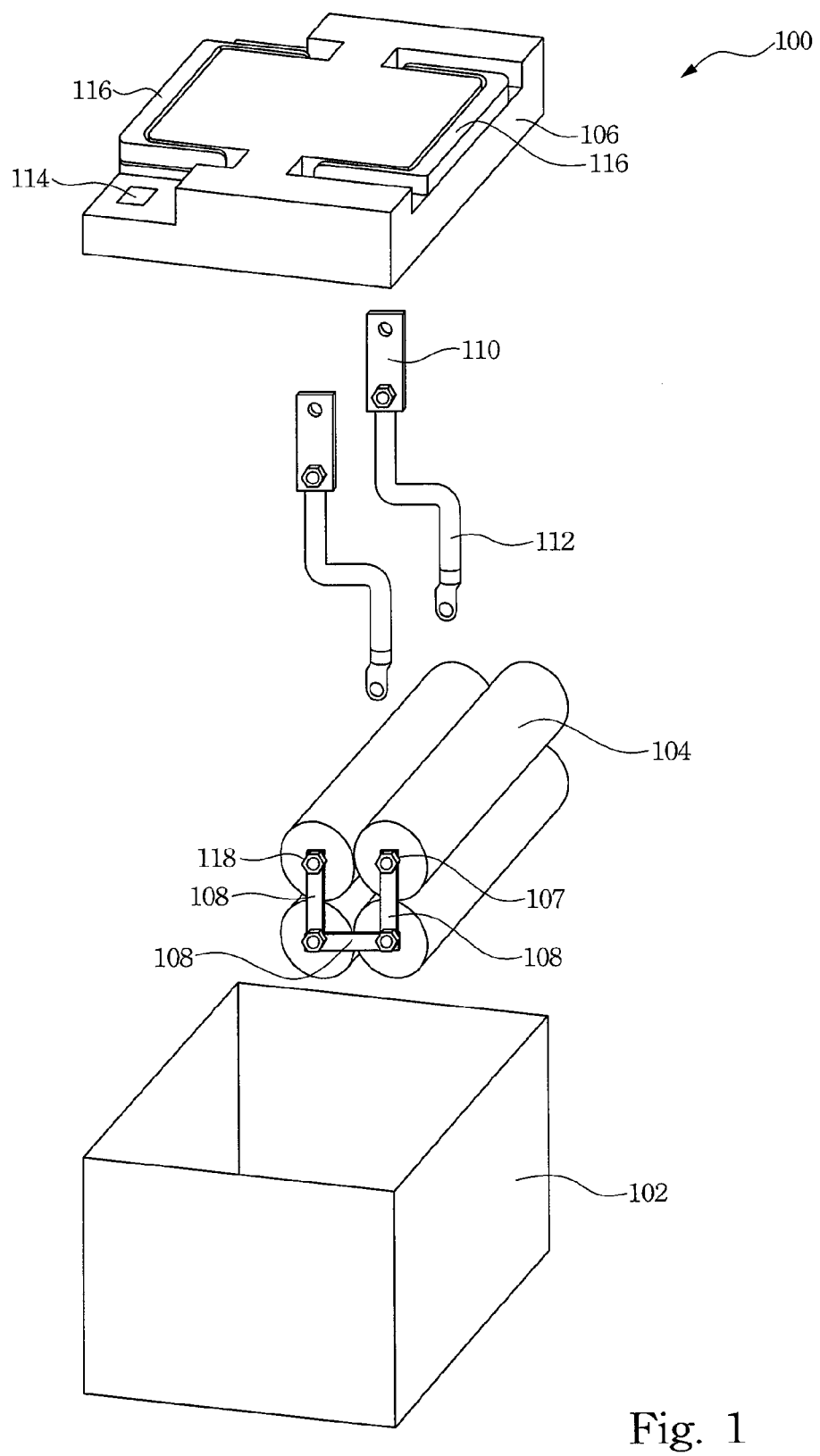
FIG. 1 is a schematic graph illustrating a car battery in accordance with a preferred embodiment of the invention.

FIG. 1 is a schematic graph illustrating a car battery in accordance with a preferred embodiment of the invention. Please refer to FIG. 1. In FIG. 1 a car battery includes a battery case 102 with an opening, batteries 104, a battery lid 106 fit with the opening of the battery case 102, and a plurality of connecting parts 108 and wires 112 with convex electrode connectors 110. Two openings 114 and a retractable handle 116 are positioned on the battery lid 106. Four batteries 104 are screwed on and connected to the connecting parts 108 and serially connected with each other to constitute a battery pack (one set of the connecting parts is shown in FIG. 1, while another set of connecting parts is not shown), and the battery pack is placed within the battery case 102. Alternatively, the connecting parts 108 can be replaced with other connecting elements in different exemplary embodiments. For example, insertable connecting parts, such as springs or spring pieces for serially connecting the batteries, can be adopted. In the embodiment, the wires 112 are connected with convex electrode connectors 110. The convex electrode connectors 110 are respectively connected and secured to the anode and cathode 118 of the battery 104 with multiple retention bolts.

After the battery 104 has been placed within the battery case 102, the battery case is covered with the battery lid and the convex electrode connectors 110 are respectively exposed through the openings 114, and the convex electrode connectors 110 function as electrodes of the car battery 100. The retractable handle can be rotated into a vertical position to facilitate a user carrying the car battery 100. In the embodiment, tightly-screwed connecting parts can not only be assembled and dismantled with ease, but also provide a shortest path (with a lowest resistance) for a current flowing through and prevent bad contact problems or an uprising resistance due to driving vibrations.

As shown in the FIG. 1, the anodes and cathodes of the four batteries 104 are connected to retention bolts 107 and the connecting parts 108, the four batteries are connected in series or parallel via the retention bolts and the connecting parts 108. For example, the anodes and cathodes 118 of the four batteries constitute a square, four retention bolts are respectively positioned on the four corners of the square, and three connecting parts 108 are meant to connect the four batteries with the four retention bolts. In the case, the three connecting parts 108 with a U-shape are implemented. In other case, the connecting parts 108 may be positioned on the diagonal of the square to connect the four batteries according to design requirements. Also, according to an embodiment of the invention, the connecting parts 108 are inserted with the retention bolts 107, and the retention bolts 107 are screwed into the four batteries to fasten them.

Furthermore, in a still other case, the anodes and cathodes of a plurality of batteries, such as six batteries, would form a rectangle. The connecting parts and retention bolts with other predetermined connection types are implemented to connect the six batteries to meet specific design requirements, so as to ensure a lowest resistance.

Figure 2A:
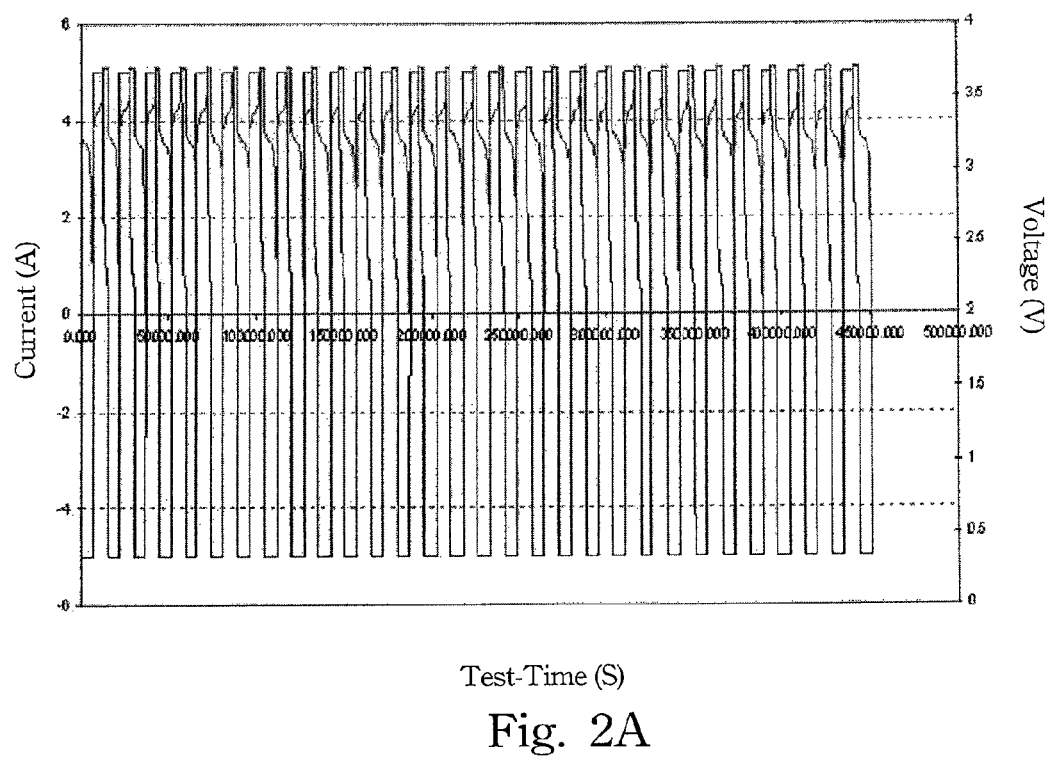
FIG. 2A and FIG. 2B show testing results of a car battery with a capacity of 10 Ah.
Figure 2B:
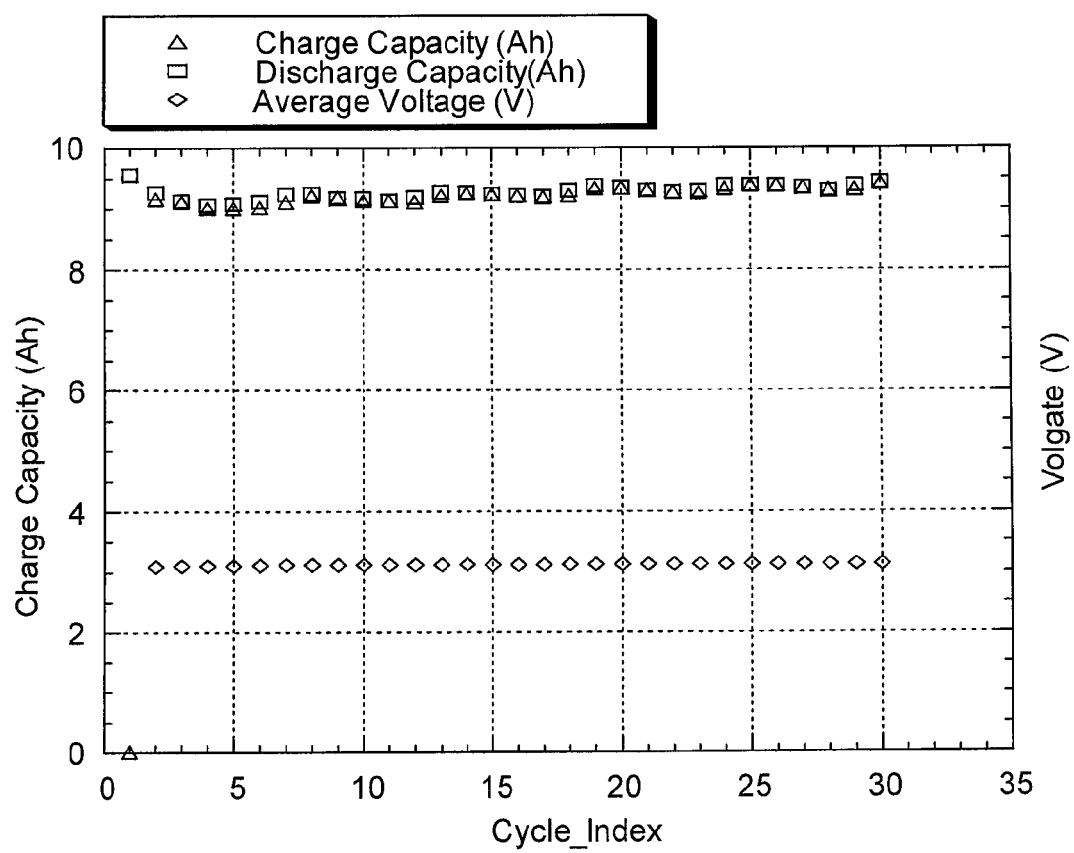

In the embodiment, the capacity of the battery 104 is only 10-20 Ah, and the battery provides output voltages in a range of 13.8-15.2 volts. Please refer to the testing results of a car battery in the embodiment and a conventional lead-acid battery. FIG. 2A and FIG. 2B show testing results of a car battery with a capability of 10 Ah. In the testing, cylinder-shaped batteries with a capacity of 10 Ah are implemented. The testing condition is meant to charge and discharge the battery with a current of 5 ampere (50% capacity), and the input and output voltages are in a range of 2-3.7V, if the voltage reaches 3.7V with a constant current, the battery operates with the voltage until the current reaches 500 mA. FIG. 2A is a graph showing a current and a voltage of the battery during 30 cycles with equal cycle time. In the FIG. 2A, the left axis represents a current and adopts ampere (A) for the unit of the current; and the right axis represents a voltage and adopts volts (V) for the unit of the voltage. One curve with larger pulses represents a variation of the voltage during the testing period, and another curve with smaller pulses represents a variation of the current during the testing period. It should be noted that the operation of the car battery 100 composed of the batteries 104 is quite stable.

FIG. 2B shows variations of the capacity and average voltage of the car battery during 30 cycles of a car battery repeatedly charged and discharged. In the FIG. 2B, the symbol "Δ" represents the charge capacity, the symbol "□" represents the discharge capacity and the symbol "◇" represents the average voltage of the car battery 100. The variation of the capacity of the car battery 100 is nearly maintained at a constant value during 30 cycles (as shown in the FIG. 2B) and has tendency to rise. Besides, the average voltage is also quite stable and nearly maintained at a constant value (about 3.1V).

Figure 3:
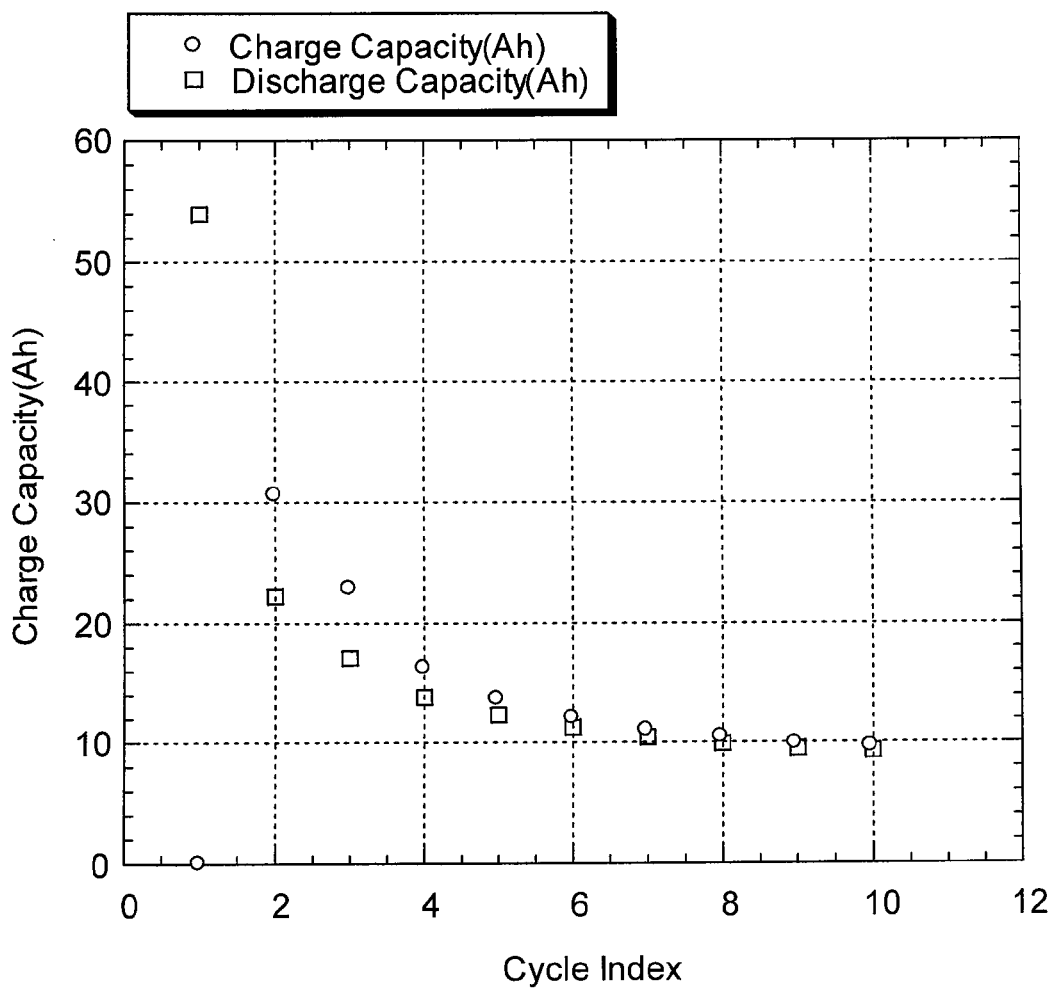
FIG. 3 shows testing results of a conventional commonly available lead-acid battery with a capacity of 60 Ah.

FIG. 3 shows testing results of a conventional commonly available lead-acid battery with a capacity of 60 Ah. In FIG. 3, the symbol "○" represents the charge capacity, and the symbol "□" represents the discharge capacity. The testing condition is meant to charge and discharge the car battery with a current of 5 ampere (C/12), and the charging and discharging voltage are both in a range of 9-13V, after the voltage reaches 13V with a constant current, the battery operates with the voltage by one hour. After a first cycle, the discharge capacity of the car battery is 53 Ah. The attenuation of the discharge capacity is quite obvious. After the fifth discharging cycle, only 20% of the capacity, about 10 Ah, is left.

According to the testing results shown in the FIG. 2A, FIG. 2B and FIG. 3, the car batteries of the embodiments still have an excellent cycle lifespan after repeatedly performing deep discharges. Such advantages cannot result from the behavior of the lead acid battery. Besides, once the deep discharge is performed, such as a car light turned on for a long time, and use the battery as a portable power supply, the car battery would still have a long lifespan and good functionality.

The car battery is characterized for low resistance, generally, the resistance is affected by the following factors:
1. the resistance of the battery;
2. the resistance of the connecting elements (such as a current collecting plate); and
3. the resistance of a car circuit and a connecting point between a battery pack and a car.

With the low resistance, the amount of the batteries serially or parallelly connected with each other can be reduced. Generally speaking, a conventional car ignition battery requires six batteries serially connected with each other to provide a sufficient output voltage (12-13V), and several conventional car ignition batteries are connected in parallel with each other to provide a capacity of 60-80 Ah. Such a complex connection results in a large number of connecting points. For the car battery of the invention, four batteries are serially connected to provide a 10 Ah capacity and are sufficient to start the car ignition and operate a car.

For ensuring the car battery of the invention can be implemented in a car, the following tests were implemented on the car batteries with capacities of 10 Ah and 20 Ah to ignite a car and provide energy for a variety of functions.

Testing 1

A tested car is an OPEL OMEGA 2000CC manufactured in 1989. Before the testing begins, the tested car uses a lead-acid battery. The tested car adopts a car battery pack with four batteries, and each battery has an output voltage of 13.2V and a capacity of 20 Ah. The car battery can be composed of two battery packs connected in parallel, each battery pack has four batteries 104. After the tested car practically operates for a long time, the testing results are shown as follow:

1. The ignition current for the car is up to 220 Ampere, the ignition operation can be repeated for five times without any waiting time.

2. After the ignition, the car battery is charged with a charging voltage of 13.8V.

3. The car light is brighter, sound of the engine is reduced, and the horsepower is higher.

4. The driving performance of the car is more stable (less vibrations).

5. After the car is driven for a week, the battery dismantled still has an output voltage of 13.6V Testing 2

A tested car is a TOYOTA PREMIO 2000CC, which was driven as a taxi. Before the testing begins, the tested car implements a lead-acid battery. The tested car adopts a car battery pack with four batteries, and each battery has an output voltage of 13.2V and a capacity of 20 Ah. After the tested car practically operates for a long time, the testing results are shown as follow:

1. The car ignition starts smoothly, the car light is brighter, sound of the engine is reduced, the horsepower is higher, the engine speed is lower when the car is cooled, and the accelerating engine speed is smoother during the operation of a car air conditioner.

2. The driving performance of the car is more stable (less vibrations).

3. After the car is driven for a week, the average fuel consumption is 8 kilometers per liter, compared with original consumption of 6.5 kilometers per liter.

Testing 3

A tested car is a VOLVO 2000CC. Before the testing begins, the tested car implements a lead-acid battery with a capacity of 60 Ah. The tested car adopts a car battery pack with four batteries, and each battery has an output voltage of 13.2V and a capacity of 20 Ah. After the tested car practically operates for a long time, the testing results are shown as follow:

1. The car ignition starts smoothly and the driving performance of the car is more stable, the car light is brighter, and the horsepower is higher.

2. After the ignition, the car battery is charged with a charging voltage of 14V.

3. The tested car with a full fuel tank is capable of driving 600 km, as compared with original 540 km.

Testing 4

A tested car is the same as the testing 1. Before the testing begins, the tested car implements a lead-acid battery of a capacity of 60 Ah. The tested car adopts a car battery pack with four batteries, and each battery has an output voltage of 13.2V and a capacity of 20 Ah (as shown in FIG. 1). After the tested car practically operates for two weeks, the testing results are still the same with those of the testing 1.

According to the four tests, the car battery can start the ignition on a variety of cars and provides a better performance and more comfort. Also, implementing the car batteries has the advantage of saving more fuel. Compared with the battery of a capacity of 20 Ah, a battery with a capacity of 10 Ah is more economical and has fewer points of connection, thus also has a higher efficiency.

Lithium ferro-phosphate batteries for starting a car ignition, unlike lead-acid batteries with a capability to 65 Ah, have a higher output power and a more stable voltage level, thus a car with these batteries has a better performance, more comfort and saves more fuel. Furthermore, the lithium ferro-phosphate batteries can perform a deep discharge (100% capability cycle). Such advantages cannot be accomplished by lead-acid batteries.

Figure 4:
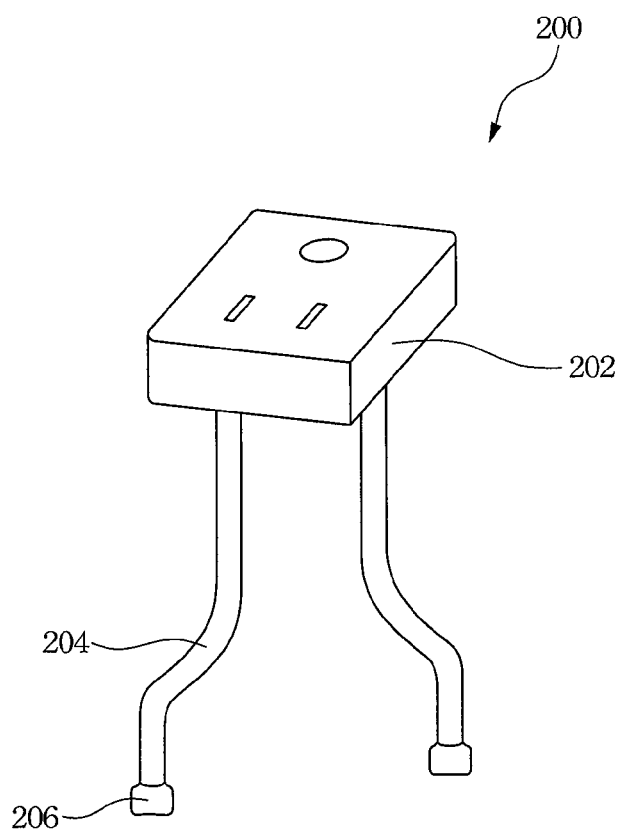
FIG. 4 is schematic graph illustrating a converting socket in accordance with an embodiment of the invention.

On the other hand, the weight of the car battery is reduced to 2.7-4.4 kg, as compared with 12-15 kg of a lead-acid battery. The car battery of the invention cannot only start the car ignition, but can also provide power for outdoor activities. As shown in the FIG. 1, the retractable handle 116 on the battery lid 106 can be rotated into a vertical position so as to enable the user to dismantle the car battery and carry it for a variety of purposes, such as a portable power supply for camp lights or a notebook. FIG. 4 is schematic graph illustrating a converting socket in accordance with an embodiment of the invention. Please refer to FIG. 4, a converting socket 200 has a socket body 202 with two or three holes to be inserted by a plug of electric appliances and portable electronic devices. The socket body 202 is connected with two wires 204, each wire is connected with a connecting member 206, the connecting member 206 is connected with each of the convex electrode connectors 110 so as to connect the car battery 100 and the socket body 202.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A car ignition battery, comprising:
   a battery case with an opening;
   a battery pack being positioned within the battery case, and the battery pack comprising at least four lithium ferro-phosphate batteries connected in series and each of the batteries provides at least 10 amp hour in capacity;
   a battery lid fit with the opening; and
   two convex electrode connectors respectively connected to the anode and cathode of the battery pack with a connector.

2. The car ignition battery of claim 1, further comprising a retractable handle positioned on the battery lid.

3. The car ignition battery of claim 2, wherein the retractable handle is capable of being rotated into a vertical position.

4. The car ignition battery of claim 1, further comprising a plurality of connecting parts for connecting the lithium ferro-phosphate batteries in serial.

5. The car ignition battery of claim 4, wherein the connecting parts are be connected to the lithium ferro-phosphate batteries with retention bolts, and the connecting parts are composed of a metal pad of a material selected from a group consisting of copper, aluminum and nickel.

6. The car ignition battery of claim 4, wherein each connecting part is a metal wire for being attached to the lithium ferro-phosphate batteries with retention bolts.

7. The car ignition battery of claim 4, further comprising a plurality of retention bolts, wherein the connecting parts are capable of being inserted with the retention bolts, and the retention bolts are screwed into lithium ferro-phosphate batteries.

8. The car ignition battery of claim 4, wherein the connecting parts are springs or spring pieces.

9. The car ignition battery of claim 4, wherein the battery lid has two openings for respectively placing the convex electrode connectors, and the convex electrode connectors extend through the two openings.

10. The car ignition battery of claim 1, further comprising a converting socket.

11. The car ignition battery of claim 10, wherein the converting socket has a socket body and two wires connected to the socket body.

12. The car ignition battery of claim 11, wherein each of the wires is connected with a connecting member, the connecting member is connected with each of the convex electrode connectors.

13. The car ignition batter of claim 12, wherein one of the two wires is directly connected between one of the convex electrode connectors and the anode of the battery pack with a retention bolt and the other of the two wires is directly connected between the other of the convex electrode connectors and the cathode of the battery pack with a retention bolt.

14. The car ignition battery of claim 1, wherein the battery pack comprises four lithium ferro-phosphate batteries.

\* \* \* \* \*